United States Patent
Hodge et al.

(10) Patent No.: US 10,651,517 B2
(45) Date of Patent: May 12, 2020

(54) LONG CYCLE LIFE PRISMATIC BATTERY CELL FOR HIGH POWER APPLICATIONS

(71) Applicant: K2 Energy Solutions, Inc., Henderson, NV (US)

(72) Inventors: James D. Hodge, Henderson, NV (US); Joseph C. Turner, Henderson, NV (US); Kye W. Stoker, Henderson, NV (US); Harley David Hoskins, Henderson, NV (US); Eric Villarreal, Las Vegas, NV (US)

(73) Assignee: K2 Energy Solutions, Inc., Henderson, NV (US)

( * ) Notice: Subject to any disclaimer, the term of this patent is extended or adjusted under 35 U.S.C. 154(b) by 375 days.

(21) Appl. No.: 14/958,688

(22) Filed: Dec. 3, 2015

(65) Prior Publication Data

US 2016/0164149 A1     Jun. 9, 2016

Related U.S. Application Data

(60) Provisional application No. 62/087,118, filed on Dec. 3, 2014.

(51) Int. Cl.
   *H01M 10/6551*     (2014.01)
   *H01M 2/02*     (2006.01)
   (Continued)

(52) U.S. Cl.
   CPC ....... *H01M 10/6551* (2015.04); *H01M 2/024* (2013.01); *H01M 2/0217* (2013.01);
   (Continued)

(58) Field of Classification Search
   CPC ........... H01M 10/6551; H01M 10/647; H01M 10/6555
   See application file for complete search history.

(56) References Cited

U.S. PATENT DOCUMENTS 5,510,203 A * 4/1996 Hamada .............. H01M 2/0245
   429/148
6,304,057 B1 * 10/2001 Hamada ................ H01M 2/043
   320/107

(Continued)

FOREIGN PATENT DOCUMENTS

KR    10-2012-0102343     9/2012
KR    10-2014-0011439     1/2014

(Continued)

OTHER PUBLICATIONS

International Search Report and Written Opinion from corresponding PCT Application No. PCT/US2015/063794.

(Continued)

*Primary Examiner* — Ula C Ruddock
*Assistant Examiner* — Thomas H. Parsons
(74) *Attorney, Agent, or Firm* — Stine Law Ltd

(57) ABSTRACT

A battery module is disclosed. The battery module comprises a housing, a heat-conducting fin disposed within the housing having a first fin surface and a second fin surface, the first fin surface and the second fin surface defining a respective first housing cavity and a second housing cavity within the housing. The battery module further comprises a first battery cell disposed within the first housing cavity and engaging the first fin surface and a second battery cell disposed with the second housing cavity and engaging the second fin surface. The heat-conducting fin is adapted to conduct heat from the first and second battery cells outwardly from the housing.

13 Claims, 4 Drawing Sheets

(51) Int. Cl.
*H01M 10/6555* (2014.01)
*H01M 10/647* (2014.01)
*H01M 2/10* (2006.01)
*H01M 4/04* (2006.01)
*H01M 10/613* (2014.01)
*H01M 10/627* (2014.01)
*H01M 10/625* (2014.01)

(52) U.S. Cl.
CPC ....... *H01M 2/1077* (2013.01); *H01M 4/0402* (2013.01); *H01M 10/613* (2015.04); *H01M 10/647* (2015.04); *H01M 10/6555* (2015.04); *H01M 10/625* (2015.04); *H01M 10/627* (2015.04); *H01M 2220/10* (2013.01); *H01M 2220/20* (2013.01)

(56) References Cited

U.S. PATENT DOCUMENTS

| | | | | |
|---|---|---|---|---|
| 8,906,558 | B2* | 12/2014 | Bauer | H01M 4/70 429/211 |
| 9,196,938 | B2* | 11/2015 | Yoon | H01M 10/653 |
| 2007/0018610 | A1 | 1/2007 | Wegner | |
| 2009/0239130 | A1* | 9/2009 | Culver | H01M 2/206 429/50 |
| 2011/0168550 | A1 | 7/2011 | Wang | |
| 2012/0045681 | A1 | 2/2012 | Klaus | |
| 2013/0266838 | A1 | 10/2013 | Von Borck | |
| 2014/0272537 | A1* | 9/2014 | Kretschmar | H01M 10/0431 429/149 |
| 2015/0064535 | A1 | 3/2015 | Seong et al. | |
| 2015/0072191 | A1* | 3/2015 | Lee | H01M 10/0431 429/62 |

FOREIGN PATENT DOCUMENTS

| | | | |
|---|---|---|---|
| WO | WO 2013187685 | * | 12/2013 |
| WO | WO 2014184419 | | 11/2014 |

OTHER PUBLICATIONS

European Supplementary Search Report, dated Aug. 16, 2018, from corresponding European patent application.

Notice to Submit Response, dated Aug. 21, 2018, comprising an English translation of paper from Korean Intellectual Property Office, in related South Korean patent application.

* cited by examiner

LONG CYCLE LIFE PRISMATIC BATTERY CELL FOR HIGH POWER APPLICATIONS

BACKGROUND

As large-scale energy storage systems are incorporated into such applications as pulsed power and directed-energy, a need for reliable, low maintenance batteries for such applications becomes critical. Consequently there is a need for large, high-rate Li-ion cells that can support a variety of such applications.

In current state-of-the-art battery cell technology, cells capable of high power output are typically limited to small, usually cylindrical formats, as thermal management issues become performance and life-limiting in larger cells. However the use of such small cells in large energy storage systems typically requires large numbers of potentially complex cell interconnects and reduces battery energy densities due to both the high packaging to active material ratio in small cells and the relatively low packing density achievable with cylindrical cells. Conversely large "pouch" cells, which have found increasing use in EV and large energy storage applications are generally limited to relatively low and moderate discharge rates as self-heating in both cell active material and internal tabs creates thermal management issues when these cells are subjected to high charge or discharge rates. In addition, the aluminized Mylar packaging material commonly used in these large cells does not provide the high stack pressure achieved by a "jellyroll" in the metal can of a cylindrical cell. Because of this, an unsupported pouch cell will typically exhibit relatively rapid impedance growth and power and capacity loss as cyclical volume changes in the active materials during operation cause the electrodes to partially delaminate. Consequently to maintain an intimate contact of the cell's active materials over the life of the cell, the Mylar pouch must be reinforced with external mechanical supports. Many applications also require additional reinforcement to protect the cell from mechanical damage.

For conventional cells, both cylindrical and prismatic, a primary path for removing heat from an operating cell is along metal tabs used to carry current out of the cell. This is the case because thermal conductivity parallel to the electrode pairs is many times greater than it is perpendicular to the electrode pairs. Consequently many battery thermal management systems operate by removing heat, either passively or through some active cooling scheme, from the cell interconnects or the battery connections themselves. This strategy may be adequate at moderate discharge rates, but in high power applications with high discharge rates, Joule heating in the cell tabs both internal and external can become significant and the consequent temperature rise in the tabs reduces and, in extreme cases, even reverses the $\Delta T$ between the tabs and the cell active material. This may result in excessive heating in the cell active material, which may accelerate material degradation and shorten battery life.

SUMMARY

A prismatic cell design is disclosed which addresses both electrode stack pressure and thermal management issues to attain small, cylindrical cell performance in a large-format prismatic design.

Other features and embodiments will become apparent upon a reading of the following detailed description together with the included Figures.

DETAILED DESCRIPTION OF THE INVENTION

Figure 2:
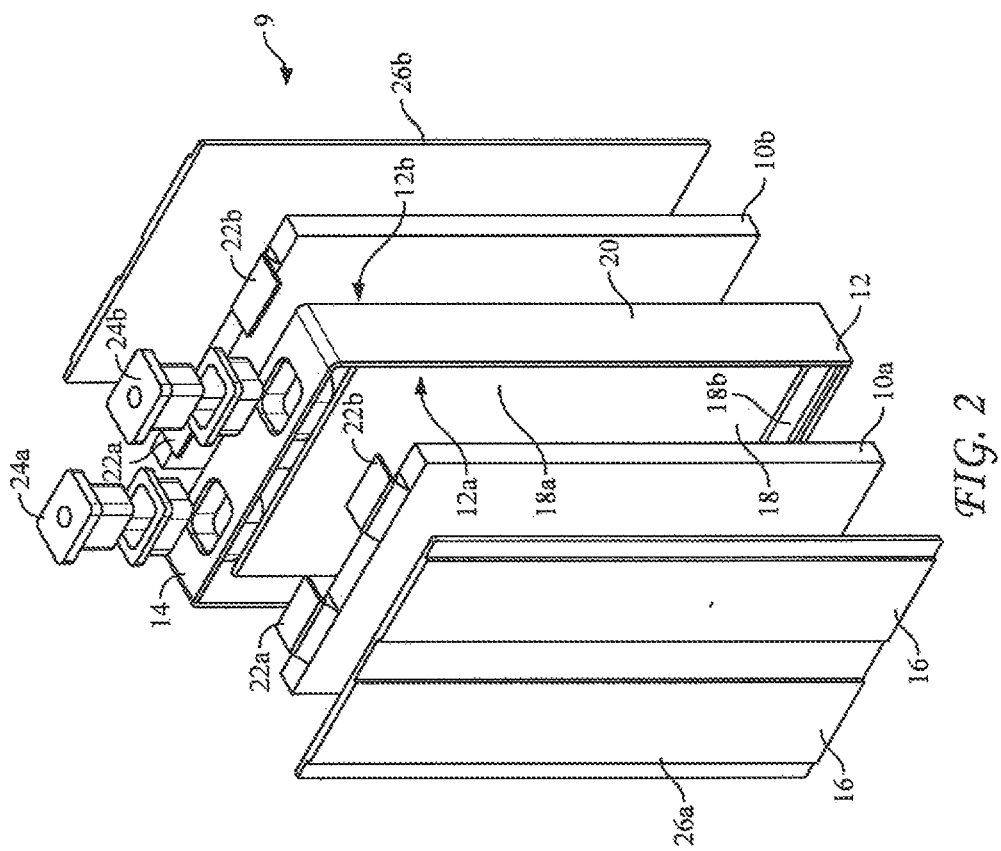
FIG. 2 is an exploded view of the cell of FIG. 1, illustrating an internal heat transfer fin.

While this invention is susceptible of embodiment in many different forms, there will be described herein in detail, specific embodiments thereof with the understanding that the present disclosure is to be considered as an exemplification of the principles of the invention and is not intended to limit the invention to the specific embodiments illustrated.

A key goal in many high power battery cell designs is to minimize the cell internal impedance, which reduces voltage sag during discharge (and increases power output) and also reduces the temperature rise during discharge due to Joule heating.

However fabricating a large, high power cell requires not only that heating in the cell active material be minimized during high current discharges, but also that any heat generated be efficiently removed. In accordance with an aspect of the present invention, a battery cell, such as a prismatic battery cell, is provided with a case, such as of an extruded aluminum, having laser-welded end caps. The aluminum case may be formed with external ridges which may serve both as stiffeners to help maintain the internal stack pressure on the cell assemblies and as stand-offs to allow for cooling channels between individual cells when assembled into a battery.

Aspects to this cell design may include: 1) An internal heat-conducting fin (or fins), such as of aluminum, stainless steel, or the like, that may conduct heat from the center of the cell to an external heat sink, such as the base of the cell for conduction to a passive or active cooling system, as well as provide additional structural support to the electrode assembly; and 2) graded coat weights on the anode and cathode films, which may position lower coat weight (and lower impedance) films at locations in the cell subject to increased heating because of a longer heat transfer path.

Assembly of the active cell assembly may utilize stacked electrodes interleaved with a continuous separator followed by a conventional hot lamination technique. Equipment for this type of assembly is already being produced by a number of manufacturers well known in the art. However instead of the conventional fabrication technique where the cell is inserted into an aluminized Mylar pouch, the present cell would be packaged in a more rigid case, described herein. An aluminum extrusion for the body of the case may be used and, once the cell tabs have been welded, or otherwise attached, to feed-throughs, the end caps may be joined, such as by welding, and the heat dissipation fin joined, such as by welding, into corresponding slots in the end cap. The end cap with the electrical feed-throughs may also incorporate a safety rupture disk as well as an opening for electrolyte dosing and formation gas pressure relief.

Implementation of one or more heat dissipation fins described herein may permit fabrication of arbitrarily thick, and high capacity, cells without compromising heat dissipation from the cell.

For very high power applications, a hollow plate, such as aluminum, containing a phase-change material (most appropriate for pulse applications) or configured as a heat pipe (appropriate for high-power, continuous discharges) may be used.

As discussed above, the present prismatic cell design may also manage internal heat generation using a graded electrode coat weight scheme. Using thermal modeling, confirmed with temperature probes in prototype cells, one may identify locations within a cell where excessive temperature rise occurs during cell operation. In subsequent cell design/builds, one may mitigate any undesired temperature rise by fabricating the cell using electrode pairs with reduced coat weights in areas of the cell where this is an issue. These reduced coat weight electrodes will discharge less current, generate less Joule heating, and have a higher heat transfer rate under given cell charge and discharge conditions.

The ridged outer body may provide a stand-off between adjacent cells that would permit forced air cooling, the insertion of fins to conduct heat to a pumped fluid cold plate, or more exotic schemes such as the use of heat pipes or phase change materials.

In accordance with one embodiment of the present invention, a conventional prismatic battery cell as contemplated herein may be in the form of a stacked prismatic battery cell. The stacked cell may comprise a plurality of alternating sheets of anode electrodes and cathode electrodes separated by a Z-fold separator layer. An end portion of the separator layer may enclose the battery cell, as is known in the art. The battery cell may also be in the form of a conventional wrapped prismatic cell.

Figure 1:
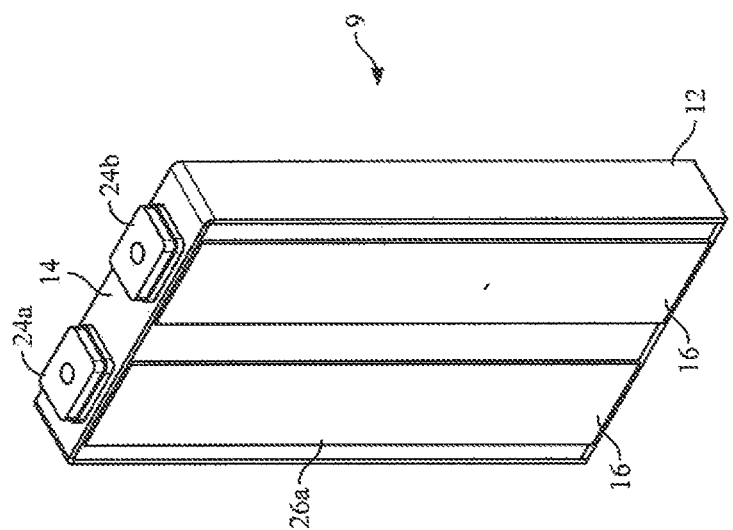
FIG. 1 is a perspective view of a first embodiment of a battery cell in accordance with the present invention.

Referring to FIGS. 1 and 2, a battery cell module 9 including two prismatic active cell assemblies, or battery cells, 10a, 10b, housed within a case 12, which may be constructed of aluminum, stainless steel, or the like, and having laser-welded end caps 14. The case 12 may be extruded, and final assembly of the battery cell module 9 may be accomplished by welding, such as laser welding or other joining methods, for example.

The case 12 may be formed with external ridges 16 which may serve both as stiffeners to help maintain the internal stack pressure on the cell assemblies and as stand-offs to allow for cooling channels between the individual cells 10 when assembled into the battery cell module 9. The case surface internal to the ridges 16 should be smooth, so as to maintain uniform pressure against the adjacent battery cell surface.

According to one aspect of the invention, the case 12 may include two adjacent cells 10a, 10b, with an internal fin 18 engaged there between, that may conduct heat from the cells 10 to an external heat sink and/or other passive or active cooling methods, as well as provide additional structural support to the assembly. The fin 18 may be of aluminum, stainless steel, or the like. The fin 18 may include a passage in the form of a hole to permit passage of electrolytic fluid across the fin 18, particularly useful when filling the battery module 9.

According to another aspect of the invention, the anode and cathode electrodes may be provided with graded coat-weights, which may position lower coat-weight (and therefore lower impedance) films at locations in the cell subject to increased heating.

Assembly of the active cell assembly may utilize stacked electrodes interleaved with a continuous separator followed by a hot lamination technique. Equipment for this is commercially available from a number of manufacturers known in the art. However instead of a conventional fabrication technique where the cell is inserted into a pouch formed of an aluminized polyester film, such as Mylar®, the cell may be packaged in the aluminum case 12.

Implementation of the heat dissipation fin 18 described herein allows one to fabricate a relatively arbitrarily thick, and high capacity, cell module without compromising heat dissipation from the cell module. Consequently it may be possible to fabricate cell modules with large capacities, such as greater than 20 Ah, by incorporating additional heat dissipation fins of various sizes, thicknesses, and materials, as needed.

Referring to FIG. 2, the battery cell module 9 includes a U-shaped can body 20 and a T-shaped, aluminum fin 18, having a vertical portion 18a (as oriented in the figure) and a base portion 18b. The fin 18 may be extruded as a single piece or welded. When placed within the body 20, the base portion 18b completes the U-shaped body 20 to form the periphery of the case 12, which are secured together such as by laser welding. The vertical portion 18a divides the case into opposing first and second cavities, 12a, 12b. First and second battery cells 10a, 10b, are disposed in respective ones of the first and second cavities 12a, 12b. Each of the first and second battery cells 10a, 10b may be fully functioning battery cells, each having a conventional output, such as a nominal 3.2 volts.

Each of the battery cells 10a, 10b may have a positive output tab 22a and a negative output tab 22b. The battery cells 10a, 10b are electrically configured as mirror images of each other, such that their respective positive tabs and negative tabs 22a, 22b, properly align and engage each other when inserted into the case 12.

The battery module 9 includes positive and negative terminals 24a, 24b, which are electrically coupled, such as by laser welding, resistance welding or ultrasonic welding, to the respective positive and negative tabs 22a, 22b.

First and second end plates 26a, 26b, are provided to complete the case 12, and may be secured such as by welding or gluing.

Figure 3:
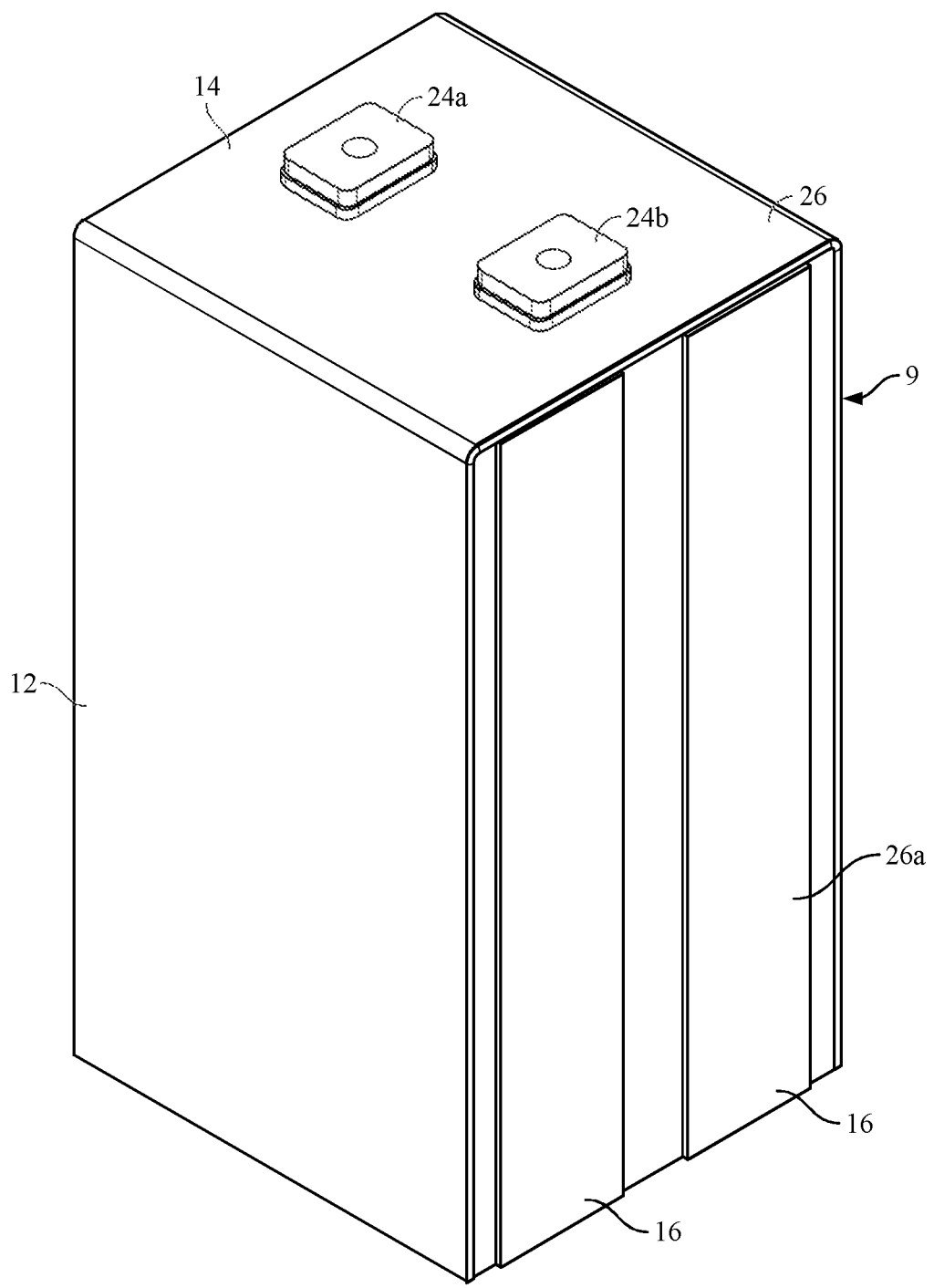
FIG. 3 is a perspective view of a second embodiment of a battery cell in accordance with the present invention.
Figure 4:
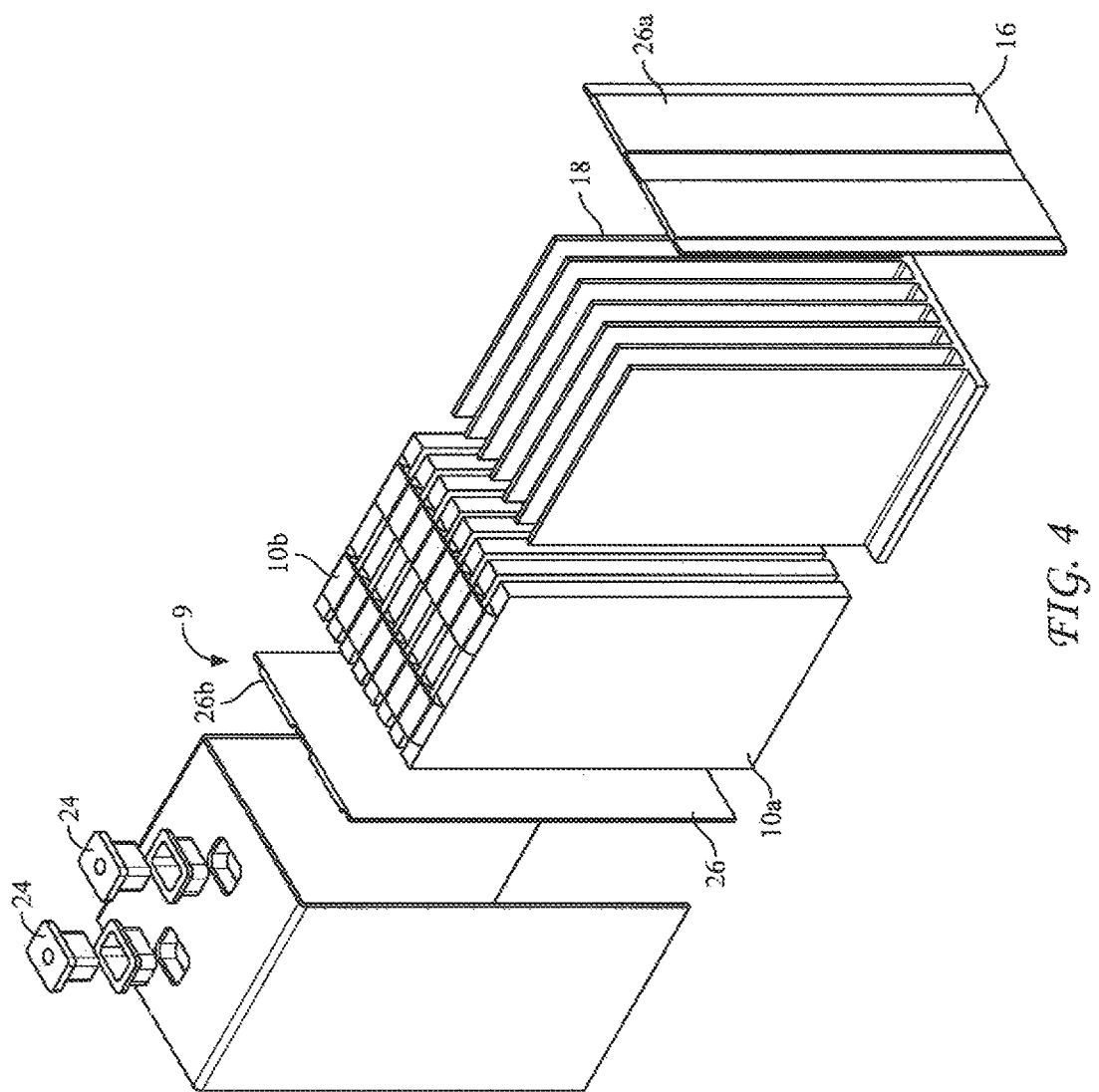
FIG. 4 is an exploded view of the cell of FIG. 3, illustrating multiple internal heat transfer fins.

Referring to FIGS. 3 and 4, a battery module 9 having even greater capacity can be achieved by adding further battery cells 10 in series, with some or all opposing battery cells 10 being separated by a heat extracting fin assembly 18. Assembly may be simplified utilizing a fin assembly formed of an extruded aluminum.

Figure 5:
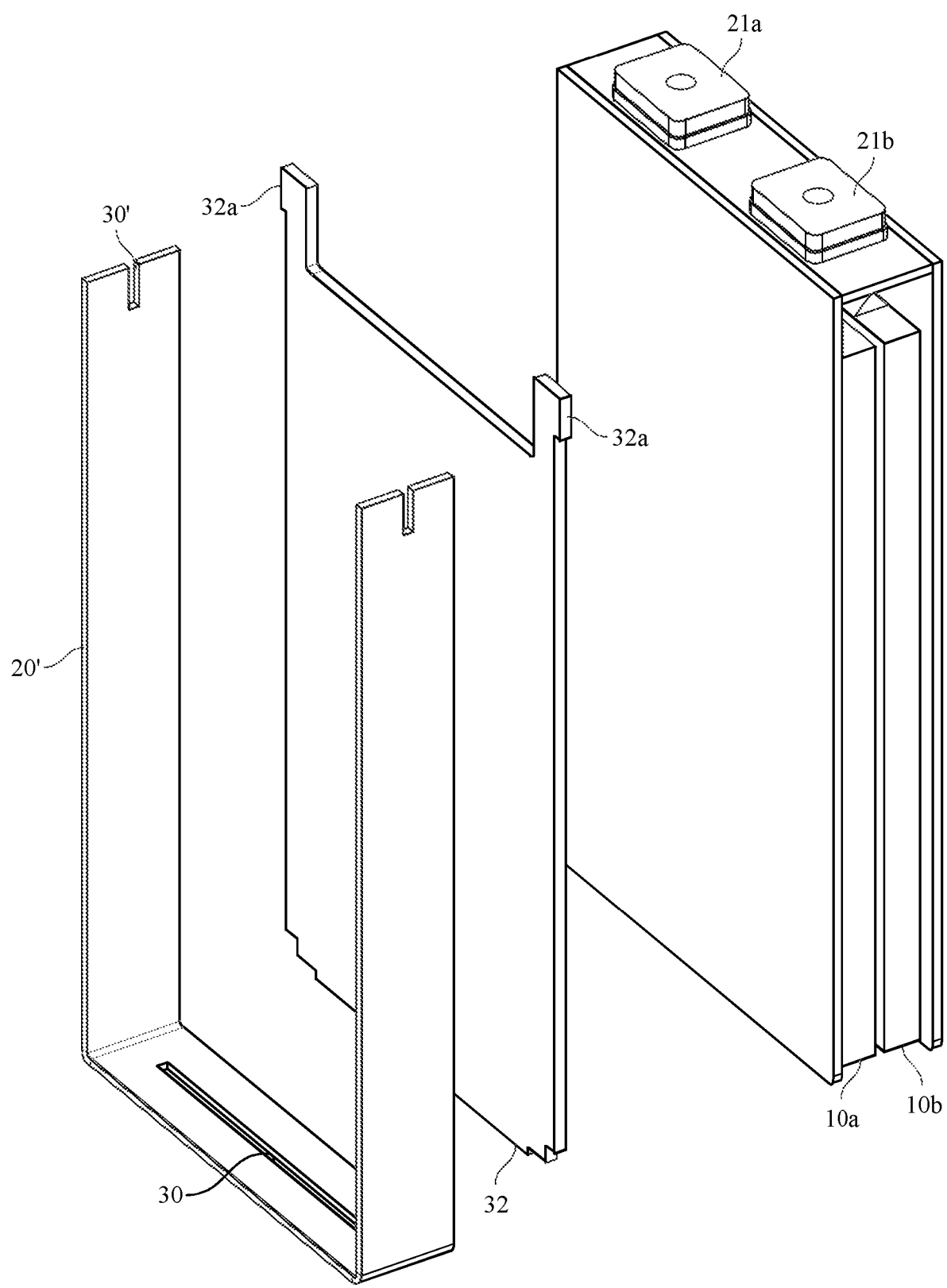
FIG. 5 is an exploded view of a third embodiment of a battery cell in accordance with the present invention.

An alternative embodiment of the invention is illustrated in FIG. 5, wherein a U-shaped body 20' may include a slot 30 to receive a protrusion 32 extending from the fin 18'. The U-shaped body 20' may include lateral slots 30' to receive include lateral protrusions 32a extending from the fin 18'. The fin 18' may be secured to the U-shaped body 20' such as by welding. Similar to the embodiments disclosed above, opposing battery cells are disposed in respective cavities.

One may use an aluminum extrusion for the body of the case 12 and, once cell tabs have been welded to the feed-throughs, the end caps 14 may be laser-welded on and the heat dissipation fin 18 laser-welded into its corresponding slot 30'. The end cap 14 with the electrical feed-throughs may also incorporate a safety rupture disk (not shown) as well as an opening (not shown) for electrolyte dosing and formation gas pressure relief.

The aluminum heat dissipation fin 18 for conducting heat out of the interior of the cell has been described. For high power applications, a fin in the form of a hollow plate (not shown), such as of aluminum, and containing a phase-change material (most appropriate for pulse applications) or configured as a heat pipe (appropriate for high-power, continuous discharges) may be used.

As described above, the prismatic cell design may also manage internal heat generation using a graded electrode coat-weight scheme. Using thermal modeling, confirmed with temperature probes in prototype cells, one may identify locations within the cell where excessive temperature rise occurs during cell operation. In alternative cell design/builds, one may mitigate this temperature rise by fabricating the cell using electrode pairs having reduced coat-weights in areas of the cell where this is an issue. These reduced coat-weight electrodes may discharge less current, generate less Joule heating, and have a higher heat transfer rate under given cell charge and discharge conditions.

Thermal management of the outer case 12 of the cell 10 may be accomplished by any conventional method. The ridged outer body may provide a stand-off between adjacent cells that may permit forced air cooling, the insertion of fins to conduct heat to a pumped fluid cold plate, or more exotic schemes such as the use of heat pipes or phase change materials.

From the foregoing it will be observed that numerous variations and modifications may be effected without departing from the spirit and scope of the invention. It is to be understood that no limitation illustrated herein is intended, or should be inferred. It is, of course, intended to cover by the appended claim all such modifications as fall within the scope of the claim.

What is claimed:

1. An electrolytic cell module comprising:
a housing adapted to retain electrolytic fluid;
a first heat-conducting fin disposed within the housing having a first fin first surface and an opposing first fin second surface, the first fin first surface and the first fin second surface defining a respective first housing cavity and a second housing cavity within the housing;
first and second active prismatic cell assemblies, wherein each of the first and second active prismatic cell assemblies comprises a plurality of stacked electrodes interleaved with a separator, wherein an end portion of each of the separators encloses a respective one of the cell assemblies without external packaging; and
electrolytic fluid disposed within the first and second cavities of the housing;
wherein the first active prismatic cell assembly is disposed within the first housing cavity and directly engages the first fin first surface;
wherein the second active prismatic cell assembly is disposed within the second housing cavity and directly engages the first fin second surface;
wherein the electrolytic fluid disposed within the first and second cavities engages the first and second prismatic cell assemblies and the first heat conducting fin; and
wherein the first heat-conducting fin engaging the first and second active prismatic cell assemblies is adapted to conduct heat away from the first and second active prismatic cell assemblies outwardly from the housing.

2. The electrolytic cell module of claim 1, wherein the housing includes a housing outer surface and the heat-conducting fin forms a portion of the housing outer surface.

3. The electrolytic cell module of claim 1, wherein the housing includes a housing outer surface and the heat-conducting fin is in thermal engagement with a portion of the housing outer surface.

4. The electrolytic cell module of claim 1 wherein each of the active prismatic cell assemblies includes an electrode having a graded coat weight to minimize excessive localized heating.

5. The electrolytic cell module of claim 1 comprising:
a second heat-conducting fin disposed within the housing having a second fin first surface and an opposing second fin second surface, the second fin second surface defining a respective third housing cavity within the housing; and
a third one of the active prismatic cell assemblies,
wherein the third active prismatic cell assembly is disposed within the third housing cavity and engages the second fin second surface;
wherein the second active cell assembly engages the second fin first surface; and
wherein each one of the first and second heat-conducting fins engaging the respective two of second the active prismatic cell assemblies is adapted to conduct heat away from the respective two of the active prismatic cell assemblies outwardly from the housing.

6. The electrolytic cell module of claim 5 wherein the first and second heat-conducting fins are aluminum.

7. The electrolytic cell module of claim 6 wherein the first and second heat-conducting fins are formed of a single extrusion.

8. The electrolytic cell module of claim 5 wherein the heat-conducting fins are stainless steel.

9. The electrolytic cell module of claim 1, wherein the first fin includes a hole extending between the first and second surfaces to permit passage of electrolytic fluid across the fin.

10. The electrolytic cell module of claim 1, wherein:
the housing includes a generally U-shaped portion;
the first fin is generally T-shaped having a first portion and a cross-portion, and
the cross portion of the first fin is secured to the U-shaped portion to form an outer periphery of the housing.

11. The electrolytic cell module of claim 1, wherein the housing includes first and second end plates.

12. The electrolytic cell module of claim 11, wherein the first end plate includes external ridges.

13. The electrolytic cell module of claim 1, wherein the housing includes a housing outer surface and the heat-conducting fin forms a portion of the housing outer surface.

\* \* \* \* \*